Jan. 21, 1936. W. A. BADDORF ET AL 2,028,430
OIL TANK INSPECTION DEVICE
Filed Jan. 16, 1934 2 Sheets-Sheet 1
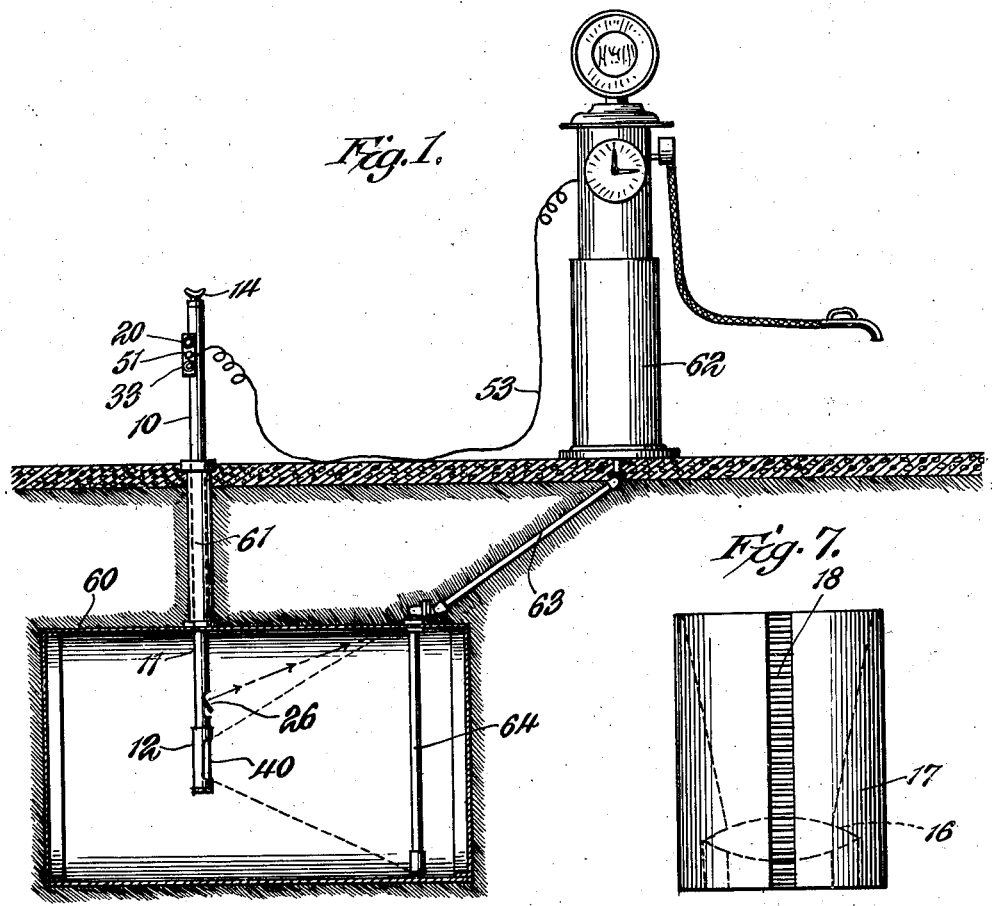
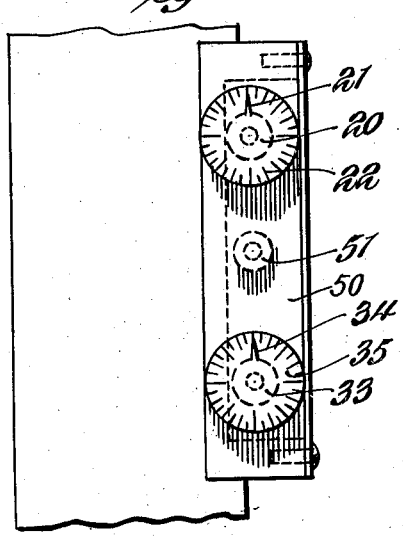
Inventors
William A. Baddorf
and Roy E. Deimler,
By Mauro + Lewis
Attorneys.

Jan. 21, 1936.  W. A. BADDORF ET AL  2,028,430
OIL TANK INSPECTION DEVICE
Filed Jan. 16, 1934   2 Sheets-Sheet 2
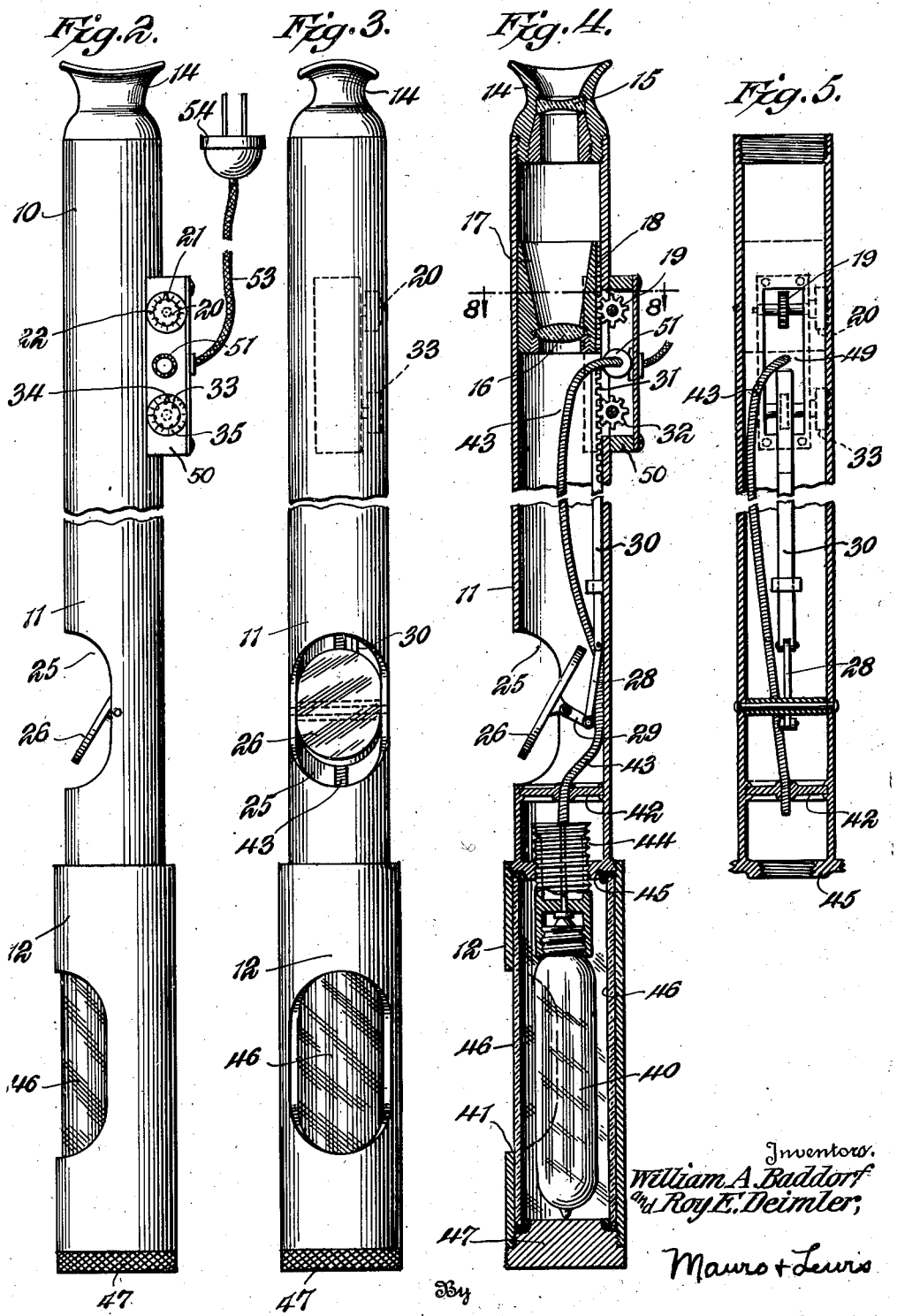
Inventors.
William A. Baddorf
and Roy E. Deimler;
By Mauro + Lewis
Attorneys.

Patented Jan. 21, 1936

2,028,430

UNITED STATES PATENT OFFICE 2,028,430

OIL TANK INSPECTION DEVICE

William A. Baddorf and Roy E. Deimler, Harrisburg, Pa.

Application January 16, 1934, Serial No. 706,902

6 Claims. (Cl. 88—71)

This invention has for its principal object to provide an implement or device whereby the interior of a tank, specially a subterranean oil-containing tank, may be visually explored for the purpose of locating an object therein, such as the stub of the suction pipe.

A common source of trouble in gasoline filling stations is the failure of the foot valve or check valve in the suction stub to close perfectly because of the intrusion between it and the valve seat of particles of dust, rust or other substance. This valve performs an important function, its office being to keep the gasoline suction pipe primed and the gauges filled at all times. In case, therefore, this valve fails for any reason to close completely, the gasoline in the pump and suction pipe drains back into the tank with the result that the pump fails to deliver the full measure of gasoline indicated on the scale. When this is found to occur, it is necessary to remove the valve for cleaning or for replacement with another valve.

Gasoline tanks are frequently buried beneath concrete driveways or roadways, with nothing to indicate their precise location apart from the filler pipe. The latter affords only a very general indication of the location of the tank, since it may be itself located at either end of the tank or at any intermediate point.

For these reasons it is very desirable that an instrument should be available whereby the location of the suction stub pipe of a subterranean storage tank may be readily determined and with such precision as is requisite for making the necessary excavation.

It has been found a difficult matter to devise a practical and efficient instrument for the above specified purpose, because of the peculiar and exacting conditions which such an instrument is required to meet. The most serious difficulty arises from the fact that usually the only access to a subterranean oil tank is through the filler pipe. Therefore important operative parts of the inspection device must be so constructed and so combined as to be housed without impairment of their efficiency within an elongated tube of such small diameter as to admit of its insertion into the tank through said filler pipe. Moreover, the operative parts should be so housed that none of them obtrudes itself beyond the circumference of said tube, else it would be liable to injury during insertion into the tank and the efficiency of the implement might thus be impaired.

Difficulties also arise because of the highly explosive character of gasoline vapors and the strict police codes which have been adopted in the State of Pennsylvania and in other states with a view to the prevention of accidents. Inasmuch as it is necessary, for making an inspection of a gasoline storage tank, to introduce into it a high voltage lamp, the conditions just referred to make it obligatory to provide the inspection device with adequate safety factors for the prevention of explosions.

It is the principal object of the present invention to provide an oil-tank inspection implement which meets the above and other requirements in a practical way and within reasonable cost limits. It has been found by actual use that those requirements are successfully met in an embodiment of the present invention such as is hereinafter described and is illustrated, by way of a non-limiting example, in the accompanying drawings, wherein Fig. 1 is a diagrammatic view illustrating, partly in elevation and partly in vertical section, a suction pump such as commonly used at filling stations, and a subterranean storage tank, showing also an inspection device made according to this invention in the position it occupies when in use;

Fig. 2 is a side elevation of said device;

Fig. 3 is a similar view at right angles to Fig. 2;

Fig. 4 is a longitudinal section, the instrument being in the same position as in Fig. 1;

Fig. 5 is a longitudinal section of the upper part of the instrument, which is shown in the same position as in Fig. 2;

Fig. 6 is an enlarged view in elevation of a part of the upper segment of the device;

Fig. 7 is an enlarged diagrammatic view showing the interior of the tube near its upper end, the eye-piece being removed; and Fig. 8 is an enlarged cross-section on line 8—8 of Fig. 4.

The elongated tube which constitutes the housing of the working parts of the inspection device, comprises three segments or compartments, the upper segment 10, intermediate segment 11 and lower segment 12. The intermediate segment 11 may be of any desired or suitable length. For convenience of illustration it is shown in Figs. 2-5 partly broken away.

The upper end of segment 10 is fitted with an eye-piece 14, the rim of which is so shaped as to fit closely the socket of a normal eye; for it has been found essential to the successful use of the device, in many instances at least, that all rays of external light should be excluded. Within eye-piece 14, and at the proper distance from the aperture thereof, is the minus lens 15 (Fig. 4) of a pair of telescopic lenses. The other member (the plus lens) 16 is set in the lower end of the tubular slide 17 which is mounted within part 10 of the housing and is adjustable by means of an ordinary rack and pinion connection 18, 19.

The construction of these parts is best shown in Figs. 7 and 8. As there shown the rack 18 is at the bottom of a vertical groove in the tubular slide 17. Pinion 19 extends into this groove and this prevents axial displacement of slide 17.

As a convenient means for adjusting lens 16 to a focus the shaft of pinion 19 is provided with a turn button 20, to which is attached a pointer 21. The position of the pointer is indicated on a circular scale 22 (Fig. 6).

In the lower part of the intermediate segment 11 of the housing is an aperture 25, midway of which is a mirror 26, pivoted in the wall of the tube so that it can be tilted on a horizontal axis to different angles. This mirror serves the usual purpose of a telescopic reflector. It also serves a special purpose in determining the location of the stub-pipe, as hereinafter explained. To that end it is provided with suitable positioning means, shown in Figs. 4 and 5 as comprising a link 28 pivoted at one end to an arm 29 attached to mirror 26 and at the other to a connection rod 30, which is secured at its upper end to a rack 31, with which engages a pinion 32. The shaft of pinion 32 is provided, similarly to that of pinion 19, with a turn button 33 to which is attached a pointer 34, whose position is indicated on a scale 35 (Fig. 6). Thus the degree of inclination of mirror 26 can be read in terms of feet and inches (or other linear measures) on scale 35, and partly by means of the indication thus obtained, the position of the stub-pipe can be accurately determined, as explained below.

Mirror 26 is of such dimensions and is so supported that no part thereof protrudes at any time beyond the outer surface of tubular casing 11.

The lower segment 12 of the elongated tubular housing serves as the container for a high voltage lamp 40, said segment being provided with an aperture 41 which is vertically in line with aperture 25 through which mirror 26 is exposed. It is necessary, however, that lamp 40 be sealed in a vapor-proof chamber. This may be effected by various means. In the embodiment shown by way of illustration in the drawings, a gas tight partition 42 is located just below mirror 26 through which partition passes the flexible cord 43 in which are the conductors that feed lamp 40. Cord 43 leads to socket piece 44, which is set in the central aperture of a partition or washer 45 which is screwed into the upper end of tube 12. All the joints of these parts are so packed as to be vapor-proof.

A glass cylinder 46 encloses lamp 40, being held by air-tight closures between washer 45 at its upper end and the stepped plug 47 which closes the lower end of housing 12.

Cord 43 is attached at its upper end to a suitable terminal block 49, located in housing 50, which contains the several rack and pinion adjusting mechanisms and may be called for convenience the control box. Said control box 50 contains also a suitable electric switch, operable by turn button 51, which is conveniently located midway between buttons 20 and 33 (Figs. 2 and 6). From terminal block 49 extends a flexible conductor cord 53 (Figs. 1 and 2) which terminates in a plug 54 of ordinary construction.

The operation of the device will be readily understood from Fig. 1. The subterranean storage tank 60 is filled through pipe 61, the top of which is approximately flush with the ground. Suction pump 62 is connected with tank 60 by pipe 63, which at its lower end is jointed to the vertical stub-pipe 64, within the tank, said stub-pipe being provided with the usual check valve or foot valve (not shown) which automatically cuts off the flow of oil in the suction pipe when the pump ceases to operate. Said cut-off valve is sometimes located at the top and sometimes at the bottom of the stub-pipe. To locate the latter it is only necessary to ascertain its direction and its distance from the filler pipe. This is readily ascertained by inserting the inspection device through filler pipe 61 until lamp 40 and mirror 26 are well within the tank. The instrument is then turned on its axis, the lamp being lighted, until the stub-pipe is located. This fixes its direction from the filler pipe. Mirror 26 is then adjusted by turning knob 33 until the top of the stub-pipe is brought into view. Then, by means of button 20, lens 16 is adjusted until the selected point on the stub-pipe is brought sharply into focus. The position of pointer 21 will then indicate the distance of the stub-pipe from the filler pipe. The operations performed in locating the stub-pipe, or other object, are:

(a) The instrument is turned on its axis until the stub-pipe is seen, its direction from the filler pipe being thus determined;

(b) Mirror 26 is tilted by turning knob 33 until the top of the stub-pipe comes into view;

(c) Lens 16 is adjusted until the selected point on the stub-pipe is brought sharply into focus.

What is claimed is:

1. An inspection implement for oil tanks and other interiors comprising: an elongated tube of small diameter adapted for insertion for a substantial part of its length through a small orifice into the enclosure to be inspected; an eye-piece at one end of said tube; a lamp enclosed in a compartment of said tube having a lateral aperture for emission of a beam of light; a reflector pivoted within said tube adjacent an aperture in line with said lamp aperture; a set of telescopic lenses near the eye-piece end of said tube; and means operable from said eye-piece end for positioning said reflector at different angles, said means comprising connections which extend from said eye-piece end through said tube and engage said reflector.

2. An inspection implement comprising: an elongated tube of small diameter adapted for insertion for a substantial part of its length through a small orifice into the enclosure to be inspected; an eye-piece at one end of said tube; a lamp enclosed in a compartment of said tube near the other end thereof, said compartment having an aperture for emission of a beam of light; a reflector pivoted within said tube adjacent an aperture in line with said lamp aperture; a set of telescopic lenses near the eye-piece end of said tube; means operable from said eye-piece end for positioning said reflector at different angles, said means comprising connections which extend from said eye-piece end through said tube to said reflector; and means also operable from said eye-piece end for focussing said lenses.

3. An inspection implement comprising: an elongated tube of small diameter adapted for insertion for a substantial part of its length through a small orifice into the enclosure to be inspected; an eye-piece at one end of said tube;

a lamp enclosed in a compartment of said tube near the other end thereof, said compartment having an aperture for emission of a beam of light; a reflector pivoted within said tube adjacent an aperture in line with said lamp aperture; a set of telescopic lenses near the eye-piece end of said tube; means operable from said eye-piece end for positioning said reflector at different angles, said means comprising connections which extend from said eye-piece end through said tube to said reflector; and means at said eye-piece end for showing the value of the angle at which said reflector is positioned at any time.

4. An inspection implement comprising: an elongated tube of small diameter adapted for insertion for a substantial part of its length through a small orifice into the enclosure to be inspected; an eye-piece at one end of said tube; a lamp enclosed in a compartment of said tube near the other end thereof, said compartment having an aperture for emission of a beam of light; a reflector pivoted within said tube adjacent an aperture in line with said lamp aperture; a set of telescopic lenses near the eye-piece end of said tube; means operable from said eye-piece end for positioning said reflector at different angles, said means comprising connections which extend from said eye-piece end through said tube to said reflector; means also operable from said eye-piece end for focussing said lenses; means at said eye-piece end for showing the value of the angle at which said reflector is positioned; and means also located at said eye-piece end for indicating the distance apart of said lenses.

5. An inspection implement comprising: a tube of small diameter adapted for insertion for a substantial part of its length through a small orifice into the enclosure to be inspected; an eye-piece at one end of said tube; a lamp enclosed in a gas-tight compartment at the other end of said tube having a window for emission of a beam of light; a reflector for locating objects in the field illuminated by said lamp, said reflector being pivoted within said tube; means operable from the eye-piece end of said tube for adjusting said reflector to different angular positions with respect to the optical axis of said tube and for holding it in its adjusted position, said means comprising connections which extend from said eye-piece end through said tube and engage said reflector; and means at said eye-piece end for indicating the value of the angle at which said reflector has been positioned.

6. An inspection implement which comprises: a tube of small diameter adapted for insertion through a small orifice into the enclosure to be inspected and comprising three compartments having a common axis; a set of telescopic lenses enclosed in one of the end compartments; an electric lamp hermetically enclosed in the other end compartment, which has an aperture for emission of a beam of light; a reflector pivoted within the intermediate compartment adjacent an aperture in line with said lamp aperture; means operable from the eye-piece end of said tube for positioning said reflector at different angles and comprising connections which extend through said tube to said reflector; and electrical connections comprising a switch at the eye-piece end of said tube and conductors for feeding said lamp extending from said switch through said intermediate compartment to said lamp.

WILLIAM A. BADDORF.
ROY E. DEIMLER.